2,887,358
LARGE SCALE METHOD FOR THE PRODUCTION AND PURIFICATION OF CURIUM

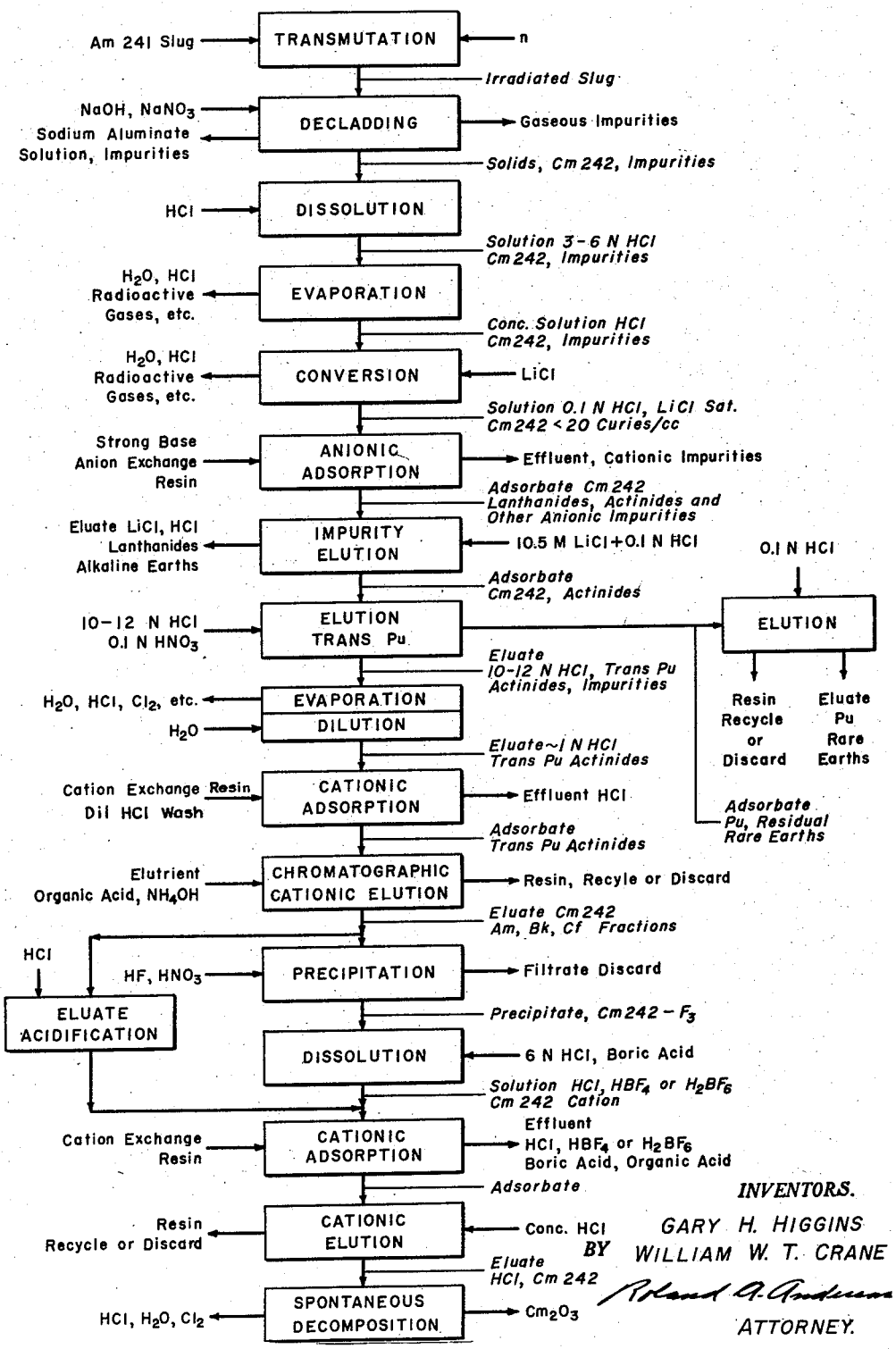

Gary H. Higgins and William W. T. Crane, Livermore, Calif., assignors to the United States of America as represented by the United States Atomic Energy Commission Application December 12, 1957, Serial No. 702,490

18 Claims. (Cl. 23—14.5)

The present invention relates, in general, to a method for the recovery and purification of large amounts of highly radioactive elements or isotopes thereof, and more particularly, to methods for the large scale production of relatively pure or concentrated, highly radioactive isotopes such as those of the transuranium elements.

For certain purposes such as for use as tracers in nuclear reactions, threshold indicators, high specific activity radiation sources, nuclear fission and transmutation processes and others well known in the art, large amounts of relatively pure isotopes of the transuranium elements are required. These isotopes are all characteristically radioactive and many cannot be produced in substantial quantities or concentrations due to excessive rates of radioactive decomposition. Characteristically the majority of the transneptunium isotopes are alpha emitters which emit alpha particles of above 4–5 m.e.v. energy. Certain of such alpha emitters, such as plutonium isotope 239, have relatively long radioactive half-lives and may be produced and purified in relatively large quantities with proper precautions. Others of said transneptunium isotopes cannot ordinarily be produced in large aggregate amounts as noted above.

Intermediate between the foregoing classifications are certain isotopes, e.g., curium 242, which is highly radioactive, but which, however, can be produced by unique nuclear reactions in relatively large amounts as described hereinafter. Such isotope emits alpha particles of slightly above 6 m.e.v. energy with a half-life of about 162 days. A material containing a high proportion of such an isotope cannot be concentrated or processed in concentrated solutions by usual radiochemical methods due to extremely violent and hazardous heat and radiation damage effects which are inherent in the processing of such materials.

More specifically, the various effects which radioparticles have on surrounding matter are ionization of matter, accumulation of heat caused by stopping of energetic particles, disruption of molecular bonds and transmutation of matter into new species of elements. The exact single cause of any given effect may not always be entirely clear. For example, high concentrations of radioactivity tend to decompose plastics and other resins, boil off and/or decompose water and other solvents, and even disintegrate the outer crystal bonds of materials of construction such as glass and structural metals. This is particularly true with high energy alphas, including those emitted by curium-242.

In determining the amount of radiation present, and therefore the probability of radiation damage to solvents, containers, process equipment, etc., the concentration or amount of radioactivity present must be ascertained. When only one element or compound is present in which a radioactive isotope is also present, it is often convenient to define the concentration of radioactivity in terms of specific activity. Specific activity is defined as the number of curies of radioactivity of a radioisotope present per gram of all isotopes of the same element, both radioactive and stable. When other materials are present, causing dilution of the various isotopes of an element, the concentrations of radioactivity may be defined in terms of total curies present or curies per gram of material. A gram of pure curium-242, for example, corresponds to approximately 2,000 curies and a cubic centimeter of pure curium-242 approximates 18,000 curies. This is a very high concentration of radioactivity or specific activity, such activity being higher than that exhibited by almost any other long lived radioisotope. The fact that curium-242 is relatively long lived, i.e., having a 162 day half-life, means that it will be present for considerable lengths of time in any material where it is formed and that special processing precautions must be taken whereever it tends to become concentrated.

In any given chemical separation process curium can be handled without other than ordinary radiochemical procedures in dilute form and when the ultimate specific activity of curium-242 is also low, the total curium fraction may be also handled without special precautions. However, when more highly purified or concentrated curium-242 is to be the ultimate product, progressively more stringent precautions must be employed as the diluent extraneous materials are removed. Precipitation methods must be avoided during processing steps where the precipitate remains in contact with the solvents since the solvent will be decomposed and boiled off with almost explosive violence. Dilution methods, seemingly the most obvious remedy, involve the solubilities of the constituents and selective absorption as well as the engineering problems of large volumes, bulky equipment, high rates of heat removal, and hazardous final evaporations and/or addition and separations of carrier elements. Extraction methods involve similar problems. The specific upper limits of concentration of alpha particle emitters that can be tolerated in a given system, as discussed more fully hereinafter, is a highly critical quantity and strongly determines the economics and feasibility of the operations.

The present invention provides a process wherein a high specific activity transneptunium isotope is produced and is treated in a series of operations integrated and conducted in such a manner and under such special conditions as to overcome the very considerable difficulties of producing such a high specific activity product. Among the operations involved are irradiation to produce the isotope, dissolution of the irradiated source material, preliminary purification, purification by especially adapted and integrated ion exchange processes and final production of stable compound. The process as developed is directly applicable to the production of curium 242 and other curium isotopes while the teachings of the invention are generally applicable to other high specific activity isotopes.

Accordingly, it is an object of the invention to provide a process for producing a high specific activity transneptunium product.

Another object of the invention is to provide a process for producing high specific activity curium products.

Still another object of the invention is to provide a method for the separation of curium from other materials.

A further object of the invention is to provide a method for the separation of curium from other materials in the presence of large amounts of ionizing radiations.

A further object of the invention is to provide a method for the chemical separation of gram quantities of purified and concentrated curium–242.

A most important object of the invention is to provide a process wherein the operations are integrated and conducted with large amounts of radiocurium under conditions which avoid ruinous radiation damage to equipment, ion exchange resins, solvents or other reagent materials and equipment employed therein.

Other objects and advantageous features of the invention will become apparent by consideration of the following description taken in conjunction with the flow diagram of the single figure of the accompanying drawing.

For simplicity the present invention will be described with reference to the production of high specific activity curium 242 products as practiced successfully while the principles concerned will be understood to apply to other high specific activity materials, equivalently. Briefly, the process of the present invention utilizes a transmutation reaction which preferably produces essentially only a single desired isotope of a particular element, although other elements and isotopes of other elements may be present, so as to avoid an isotope separation operation. The transmuted material is dissolved, usually after preliminary removal of an irradiation container and other extraneous material, to provide a dilute impure acid solution thereof. Subsequent to conversion of such an acid solution into a lithium chloride solution, a curium fraction is separated from such solution in an anionic exchange operation as a partially purified acidic chloride effluent. Subsequently, the curium fraction may be alternatively further purified in a cationic exchange column operation followed by a fluoridic precipitation from the cationic exchange effluent. Then the curium fraction is still further purified by redissolution and a second treatment in a cationic exchange column. Finally, the highly purified curium fraction is recovered as an oxide from the effluent of the second cationic exchange column by a novel flash evaporation procedure.

More particularly, with reference to the flow diagram of the drawing, the process of the invention is preferably practiced on a transmutation product wherein essentially only a single desired isotope of a particular material is present or any similar material containing a large quantity of high specific activity isotope. In a preferred transmutation for producing curium–242, americium–241 is bombarded with thermal neutrons in a nuclear reactor, forming americium–242 which decays to curium–242 upon beta emission. The purity of the Cm–242 product is improved by utilizing a reasonably pure americium–241. A number of fission and other absorption reactions occur on slow neutron irradiation to produce impurities according to the following series of reactions:

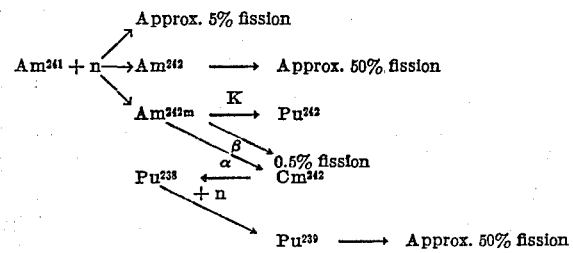

Americium has a slow neutron absorption cross section of 850 barns. Because of the extreme complexity of the reactions the overall fission cross section cannot be stated with complete exactitude. A few other actinide isotopes are also produced in small but troublesome quantities.

Use of transmutation processes as a means of producing large quantities of an isotope is relatively new. In particular instances as with $Cm^{242}$ such a reaction has advantages over the fission method of manufacturing isotopes. Specifically, by-products of the americium transmutation are limited to small amounts of transmutation elements other than curium–242 and conversion to the desired isotope is high, being about 44% of the original americium in the present instance.

To produce milligram quantities it is current practice to loosely dispose a quantity of the predecessor isotope or chemical compound thereof within an irradiation capsule, e.g., a thermally conducting container, and to dispose such assemblage within a nuclear reactor. Therein the moderated neutrons impinge upon the predecessor isotope and transmutation proceeds at a rate determined by the reaction cross section of the initial isotope, the energy and flux of the neutrons and other factors well known in the nuclear reactor art. The heat generated within the matter being transmuted is conducted through the metallic particles within the container to the container walls and thence to the reactor coolant system.

With larger quantities and higher concentrations of materials very special irradiation and cladding techniques are required due to the very high thermal output of the materials on irradiation. For producing gram or larger quantities of relatively concentrated products a technique such as that disclosed in the application of Carrol M. Gordon, entitled Nuclear Reactor Irradiation Capsule, Serial No. 624,950, filed November 28, 1956, is employed. Essentially, as disclosed therein, a compound of the material to be irradiated, i.e., fluorides or oxides of $Am^{241}$, may be dispersed within a metal matrix by grinding the material to a powder of about −400 mesh, mixing it intimately with finely divided particles of the conducting metal to be used, e.g., aluminum, placing the mixture in a metal sleeve having a slidable metal plug at each end and compressing the powder to a density approaching that of the conducting metal constituent by applying force simultaneously upon both plugs while the sleeve is within a compression die. The conducting metal, in practice usually aluminum, undergoes plastic flow, forming a dispersion of particles throughout an essentially continuous solid. Plastic flow is necessary to insure bonding of the individual particles of metal. The final density must be high enough to produce heat transfer characteristics adequate to remove the heat generated by the particular reaction undertaken. A limit of about 1000 watts per square inch of heat transfer surface is set by practical limitations. In practice up to gram quantities of americium–241 (oxide or fluoride) (82%), containing varying impurities of iron, plutonium, nickel, lanthanum, magnesium and calcium have been mixed with aluminum dust to produce a mixture containing a maximum of about 8% americium–241. The mixture is compressed into an irradiation capsule using the method as previously disclosed. Irradiation time depends upon the neutron flux, but maximum build-up occurs at no longer than about 160 days because this is the half-life of the product curium–242. With a flux of the order of $10^{14}$ neutrons per square centimeter per second about 44% of the americium is transmuted to curium after 100 days. As much as 1000 curies of alpha activity have been reactor produced in a single 50 gram fuel element of 15 ml. volume without any deleterious effects. The aforementioned radiation capsules generally have a total weight of two to 50 grams, and upon removal from the type of nuclear reactor used at present for irradiation purposes, e.g., the MTR at Arco, Idaho, have a total alpha activity ranging to at least 2000 curies. The capsules are generally stored for a period of time to permit complete transformation of the $Am^{242m}$ into $Cm^{242}$ by $\beta$ decay as indicated above.

Subsequent to transmutation the product material is declad, separated from certain impurities including cladding material and converted into a form suitable for further processing. The irradiated capsule compact contains the product $Cm^{242}$, aluminum cladding and matrix material together with impurities derived from source material and produced by spurious transmutation and fission reactions and therefore including at least lanthanide and actinide elements and various fission products. These and subsequent operations are conducted in hot cave or shielded glove box apparatus of the conventional character used for processing highly radioactive materials but with certain limiting conditions in accordance with the invention as set forth more fully hereinafter.

Mechanical methods may be employed to remove a portion of the cladding; however, it is more convenient to perform the operation chemically. Accordingly, one or more of the irradiated compacts are decomposed and to a large extent dissolved in an aqueous solution of sodium hydroxide and sodium nitrate. The concentrations are not critical; 4 M sodium hydroxide and 3 M sodium nitrate have been found suitable. A temperature of 85–100° C. has been found advantageous for promoting decomposition with a time of four hours generally being sufficient. Considerable amounts of gaseous ammonia, water vapor, rare gases, gaseous fission products, etc., are evolved yielding a slurry in a sodium aluminate solution. The gaseous materials should be treated and disposed as radioactive waste. Water must be added from time to time to replace water lost by alpha particle induced disintegration, or returned with a suitable reflux condenser. The aforesaid slurry is decanted or filtered. Stainless steel frit, five microns in pore size, at a filtering rate of 10 ml. per min. per 50 cm.$^2$ filter area, may be conveniently used for filtering. The resulting filter cake consists of curium, fission and transmutation products and other impurities derived from the slug and other sources. The alkali metals, ammonium complexes of copper, nickel, etc., the halide ions and the amphoteric metals, e.g., $CrO_4^=$ and $MoO^=$ to a major extent remain in the solution. The cake is washed with 2 N sodium hydroxide, 1 and 5 N ammonium hydroxide and water, preferably, although water alone will suffice to eliminate many occluded materials. In this operation sufficient other material is generally present and the form of the precipitate is such that the critical decomposition limits of the specific activities are not exceeded; however, sufficient heat is evolved to boil the water away explosively to leave a dry filter cake. Precautions against spattering should be taken.

The filtrate and washings generally contain a small part of the curium, about 1%. To effect recovery a solution containing ferric ion is added which, because of the alkalinity of the solution, precipitates as ferric hydroxide carrying the curium. The precipitate is filtered in the same manner as the original slurry. The combined precipitates are then dissolved in a relatively large amount of dilute hydrochloric acid, e.g., 3–6 N HCl yielding a solution containing impurities. Curium and fission and transmutation products are contained in the solution, gross amounts of some impurities having been eliminated. If undissolved refractory oxides remain after hydrochloric dissolution, they are centrifuged from the acid solution and the precipitate is fused for 20–30 minutes at 950° C. in a platinum crucible with sodium carbonate. The fused material is allowed to cool to room temperature and 12 N HCl is added slowly to effect dissolution. The solution is added to the supernatant from the centrifugation step. Other conventional methods of effecting complete solution may be used to provide a hydrochloric acid solution containing the curium. In any event there is first produced a dilute (about 3–6 N) hydrochloric acid solution of curium isotope-242 together with varying amounts of impurities including lanthanides, actinides, fission products and small residual amounts of other impurities derived from the irradiation capsule, reagents, etc.

Subsequent operations in the process of the invention become progressively more difficult since the concentration must now be increased to critical levels with regard to apparatus and reagent limitations in order to effect the separation, purification and recovery of the highly concentrated final product. Accordingly, the aforesaid dilute hydrochloric acid solution is converted into a concentrated lithium chloride or other solution containing the curium-242 in a critical concentration range suitable for treatment in an ion exchange column. LiCl concentrations above about 8 N are operable; however, results improve as saturation concentration is approached and therefore concentrations of LiCl approaching saturation are preferred.

With regard to operations in aqueous solutions and the materials of which such columns are constructed, at concentrations of above about 5 curies per cc. of curium-242, peroxide formation occurs so as to complicate the chemical reactions. Above 15 curies per cc. heat evolution becomes increasingly serious. These two factors become excessive at about 20 curies per cc. of aqueous solution. With ion exchange resins, the upper limit of the range in which separation is effected was found to be 60 to 120 curies per square centimeter of cross-sectional column area, area rather than volume being found to be the better indicator of criticality. At about 60 curies per square centimeter, the lower end of the range, decomposition of the resin begins, and poorer separations are obtained. At approximately 120 curies per square centimeter the resin is decomposed at such a rate that it ceases to be selective in adsorption of constituents and no separation is effected. In actual practice ranges between 60 and 100 curies per square centimeter have been found most practical. It should be understood that it is only when a solution is processed that the critical concentration must be observed, since in interim periods the solution may be allowed to evaporate, if precautions are taken against spattering, explosive boiling, etc., and the solution later reconstituted for further processing.

With respect to disintegration of the crystal bond of materials of construction, applicants have ascertained that plastic containers (polystyrene) undergo disintegration and volatilization when the concentration reaches the same general range as that reported above for the disintegration of ion exchange resin beds, viz., 60 to 120 curies per square centimeter of surface. Glassware has been found satisfactory for all liquid concentrations; however, over a period of time glassware disintegrates upon contact with pure solid curium-242 or curium-242 oxide. The usual structural metals form satisfactory containers, although an oxide film invariably forms at higher concentrations when water is present. After a film of 5–10 mils thickness builds up, oxidation of the container wall ceases. In this regard, the inventors have found that the noble metals gold and platinum are not superior to non-reactive metals, e.g., nickel and stainless steel, generally used for materials of construction.

To effect separation of the transuranium elements, the solution is carefully evaporated with the evolution of certain gaseous materials including bromine, chlorine, iodine and other fission products. As evaporation is continued a LiCl solution approaching saturation, e.g., 10 to 13.5 M, is added to effect replacement of the HCl with LiCl to yield a saturated impure LiCl solution which is about 0.1 N in HCl and containing the $Cm^{242}$ at a concentration below about 20 curies per cc. together with the impurities. Such a solution contains the Cm, various other actinides and impurities as anionic chloride complexes. The solution is passed through a strong base anion exchange resin column, i.e., cross-linked polystyrene polymer having quaternary amine substituents thereon, pre-equilibrated with saturated LiCl solution and heated to about 90° C. (Dowex 1, Dowex 2 and similar resins are suitable). The volume of resin in said column is determined to be at least sixfold to tenfold of the solution volume and the cross-sectional area is determined to be about $\frac{1}{50}$ of the gross activity in curies to assure that the aforesaid critical limit of activity is not exceeded and effective separation is obtained. The anionic complexes of Cm–242, various lanthanides, actinides and small amounts of other anionic impurities are absorbed from the solution. Then 10.0–10.5 M lithium chloride, 0.1 N hydrochloric acid solution is passed through the column to chromatographically elute at least some of the alkaline earths and lanthanides from the column. Curium and americium, berkelium and californium actinides are then eluted as a group fraction, containing small amounts of other impurities, including lithium chloride, with a solution of 10–12 N HCl, if no Pu is present, or 10–12 N HCl and preferably, about 10.5 N HCl contailing 0.1 N $HNO_3$ if Pu is present, to prevent elution of the Pu. The nitrate ion prevents conversion of the adsorbed Pu complex to a soluble complex. This fraction is estimated to be about 99.5% pure and all further steps involve repurification and/or separation of the actinides. Plutonium complexes and certain other anionic materials remain adsorbed on the resin. The crude curium solution is evaporated, if needed, to a volume commensurate with the critical concentration condition required in the succeeding ion exchange separation. Hydrochloric acid and chlorine are both evaporation products.

If desired the plutonium and certain other residual rare earth metals may be stripped from the resin by elution with dilute hydrochloric acid, e.g., about 0.1 N HCl, and recovered by conventional evaporation or precipitation techniques. The resin itself remains radioactive, since a certain amount of the radioisotopes always adheres to the resin. Accordingly, such resin is generally stored in slurry form and reused to reduce loss, or discarded as radioactive waste.

Optionally, the lithium chloride may be further separated from the curium fraction by selective absorption of the curium values on a cationic exchange column of the sulfonic acid substituent type and of the proper dimensions with respect to critical volumes and preferably operated at about 90° C. Rinsing the column with 1 to 6 N HCl eliminates the LiCl from the column. The purified curium fraction is then eluted with 12 N HCl and the effluent eluate is evaporated as in the previous step to a volume commensurate with the critical concentration condition.

Either of the evaporated solutions obtained in the foregoing manner is then diluted to about 1 N HCl and passed through a cationic exchange column, of the sulfonated polystyrene type, in which the resin is in the ammonia form, to adsorb the curium and other actinides. Then the curium and other actinides are chromatographically eluted with buffered aqueous solutions of lactic acid, citric acid, alphahydroxy-isobutyric acid, tartaric acid or other organic acid complexing agent adjusted to an appropriate pH with ammounia. However, lactic and alpha-hydroxy-isobutyric acids have been found superior as elutriants and are therefore preferred. For the purification step under consideration, 0.4 M alphahydroxy-isobutyric acid at pH 4.5 and 2.5 M lactic acid at pH 4.5 have been found advantageous. The actinides appear in discrete eluate fractions and are collected separately. To reduce loss eluted resin is stored as a slurry after use, and reused in subsequent operations or disposed as radioactive waste.

Optionally further purification of the curium from the eluate may be effected by precipitation of the curium as a fluoride with americium away from other trace impurities. Concentrated hydrofluoric-nitric acid (2 N) mixture is added to the curium fraction of the chromatographic eluate and the solution held at 70° C. for two hours for best results. The resultant curium fluoride ($CmF_3$) slurry is then cooled to room temperature and filtered through a stainless steel filter. The precipitate is purified by washing with 0.1 N hydrofluoric acid containing 2 N nitric acid. Although the product is in highly concentrated form, and therefore above the critical limits previously set forth, the precipitation step may be carried out without difficulty as long as no attempt is made to maintain the curium fluoride in contact with a liquid, remove it from the filter, etc.

If no greater purity is desired, the curium fluoride may constitute the product; however, to obtain greater purity the precipitate is dissolved in 6 N hydrochloric acid saturated with boric acid, the boric acid serving as a complexing agent whereby the fluoride enters the solution as fluoboric acid, $HBF_4$ (or $H_2BF_6$) together with the curium. The chromatographic eluate fraction containing the curium from above may likewise be acidified with HCl to yield a solution from which the curium may be recovered in a purified form as described hereinafter.

Either the acidified eluate or the acidified solution prepared from the precipitate is contacted with a cationic exchange column of the type previously mentioned to adsorb the curium; the column is rinsed with 0.1 N hydrochloric acid; and then the curium is eluted from the column with concentrated hydrochloric acid. The purified curium in the eluate is conveniently converted to the pure oxide form by evaporating the solution to near the critical limit and then placing amounts of the solution in gold or other metallic containers wherein both the water and the hydrochloric acid in the solution slowly disintegrate leaving the curium-242 deposited as the oxide therein. Other stable compounds, such as the fluoride prepared as above may also be obtained. Gross amounts of curium-242 products containing less than 1 p.p.m. of impurities have been prepared by the present method.

In the foregoing procedure an anion exchange operation utilizing concentrated hydrochloric acid as the eluting agent may be substituted for the lithium chloride elution with a lesser degree of separation. Such an operation separates the $Cm^{242}$ from common anions, in addition to iron, gold and platinum. Repetition of the steps is required since this elution is not as efficient as the lithium chloride elution. The individual actinides can then be separated from each other and from the lanthanides by treatment in a cationic exchange column using concentrated hydrochloric acid as the eluting agent.

Further details of the process of the invention will be apparent from the following illustrative example:

*Example*

Twelve irradiation capsules, each composed of approximately 0.5 gram of americium oxide compressed with aluminum dust within an aluminum sleeve with aluminum plugs of the ends thereof, as described above, and each weighing approximately 50 grams, were irradiated in a neutronic reactor having a flux of the order of $10^{14}$ n/sq. cm./sec. for 110 days. At the end of the irradiation period each capsule was estimated to contain 0.2 gram of curium, being equivalent to a total of 2.4 grams, corresponding to $1.8 \times 10^{16}$ $\alpha/m$ total alpha activity. At the time the curium separation was undertaken the capsules had been out of the neutronic reactor for 35 days. The fast neutron measurement from the top of the opened unshielded shipping container was 9,000 m.e.v./sq. cm. Slow neutron measurement from the same position was 72,000 neutrons/sq. cm./sec. The separation work was done by means of equipment assembled in three shielded glove boxes. All processing was remotely effected with manipulators. The twelve capsules were processed batchwise, two at a time, as follows: Two capsules were treated with a solution consisting of 254 grams sodium hydroxide and 285 grams sodium nitrate made up to 1950 ml. with distilled water. The resulting slurry of aqueous and solid matter was then filtered through a stainless steel frit of approximately 5 micron pore size leaving the curium as hydrous oxide containing impurities, undissolved on the filter. The filter cake was washed with 40 ml. of 2 N sodium hydroxide, 20 ml. 5 N sodium hydroxide and 20 ml. water and then was dissolved by back washing with 50 ml. of 6 N HCl. No difficulty in dissolution was encountered and carbonate fusion of refractory oxides was therefore not necessary. A small amount of ferric nitrate was added to the filtrate from the original dissolution step, but insufficient curium precipitate was obtained to necessitate addition of the resulting cake to the curium fraction. Each batch of the curium fraction was contained in about 120 ml. of 3 N hydrochloric acid and included about 400 milligrams of curium mixed with actinides and various fission products. Radio assay indicated $2.9 \times 10^{15}$ disintegrations per minute and combined radio assay showed a total of about 2.0 grams of curium to be present in the impure solution produced in six dissolution runs.

The batches of impure curium solution were then converted successively into an acidic saturated lithium chloride solution wherein the original identity of the batches was progressively merged since, after treatment of each batch, the equipment was cleaned up and the clean-up liquids added to the next batch. Moreover, because of the high concentration of curium dissolved in the solution the rate of water evaporation was high due to the heat release and the condensate therefrom was recovered and added to a subsequent batch whenever possible, further commingling the original batches. In the first run which was representative of the others, 80 milliliters of 13.5 M lithium chloride solution was added to the batch of impure curium solution from one of the dissolution operations, the entire solution was evaporated to dryness and then made up to 80 ml. with 0.1 N hydrochloric acid. Meanwhile a 13 sq. cm. by 30 cm. long 390 ml. total volume anion exchange column fitted with heat jacket was filled with a strong base anion exchange resin (Dowex 1). The column was maintained at a constant temperature of 90° C. and pre-equilibrated with saturated lithium chloride solution. A rinse of the vessel previously containing the curium values was made with 80 ml. 13.5 M lithium chloride and the rinse was also added to the column. The curium solution was then passed through the column to adsorb the curium as a chloride complex thereon and the column washed with 500 ml. of 10.5 M LiCl, 0.1 N HCl solution to elute alkaline earths and lanthanides. Impure curium values were then chromatographically eluted from the column with 800 ml. of solution containing 10 N hydrochloric acid and 0.1 N nitric acid at a rate of 6–8 ml. per minute. Eluate fractions were collected in cones or individual small containers containing 40 ml. or less each. The fractions having the highest alpha counts related to content of curium values were combined, evaporated to 100 ml. and then diluted with water to 420 ml. At this point the column was washed with 1,000 ml. 0.1 N hydrochloric acid to strip the plutonium and adsorbed impurities therefrom.

The diluted eluate solution of curium values was then passed through a different column containing Dowex 50 cationic resin to adsorb the curium. 400 ml. of 0.5 N hydrochloric acid was then used to wash the column removing remaining traces of lithium chloride and absorbed impurities. Finally the curium values were chromatographically eluted from the column with concentrated hydrochloric acid (above about 12 N) and collected as fractions in cones. The solution in the cones containing the major portion of the alpha count was combined, an estimated 250 mg. of curium being contained in the solution yielding a batch of semi-purified curium solution. Subsequent to washing with dilute HCl and pre-equilibration with saturated LiCl, each of the remaining batches was processed successively through the same column to produce five other batches of semi-purified curium solution.

The batches of semi-purified curium solution were then selectively adsorbed and eluted from a 13 sq./cm. by 30 cm. long cationic exchange column of the type heretofore mentioned. The resin was in the ammonium form and the column was operated at about 85° C. In treating the first batch 750 ml. of the semi-purified solution of curium values containing about 196 mg. of curium was first evaporated to 200 ml. Meanwhile the cationic exchange resin column was heated to 87° C. and pre-equilibrated with 450 ml. of a 0.4 M aqueous solution of alpha-hydroxy-isobutyric acid having a pH of 4.48. The curium solution was then passed through the column to adsorb the curium followed by 50 ml. of 1 N hydrochloric acid to displace the residual solution. The container was washed successively with 25 ml. of 0.25 N hydrochloric acid and 50 ml. 0.5 M ammonium hydroxide solutions and these were also passed through the column. The curium was then chromatographically eluted and collected as fractions in cones with 0.4 M alphahydroxy-isobutyric acid at pH 4.48. The better fractions with the highest alpha count were combined and the curium adsorbed therefrom by passage through a third, cationic column together with 35 ml. dilute hydrochloric acid washings from each cone, the solutions being acidified with 6 N hydrochloric acid to the amount of 0.08 ml. acid per milliliter of solution. The column was then washed with 200–300 ml. 0.1 N HCl and the purified curium eluted with 600 ml. 13 N HCl and fractions were collected and combined. The combined amount of curium-242 recovered during the process was 1440 mg., or about 60% recovery. The purity was determined to be 99.99%.

In a final capsuling step, the solution containing the purified curium was placed in a capsuling box, i.e., a glove box where small amounts could be handled by semi-remote control. Volumes of solution containing 5 mg. of curium were pipetted into gold capsules of internal dimension ¼" high by ¾" diameter and allowed to evaporate. As more and more of the water evaporated, additional heat was created by effects hereinbefore described which increased the evaporative rate until no water remained, at which time the capsule was closed by soldering.

The solutions of plutonium values from each of the six batches were commingled and the curium recovered therefrom as follows: 560 ml. of the solution was evaporated to dryness and made up to 200 ml. with concentrated hydrochloric containing also 0.1 N nitric acid. The solution was passed through a strongly basic anion exchange column (Dowex 1) to adsorb the plutonium values therefrom while the curium values remained in the solution. Washing with 600 ml. of 12 N hydrochloric acid and 0.1 N nitric acid removed the residual solution and the plutonium was then eluted separately with 0.1 N HCl. The curium initially eluted was further purified by adsorption on a cationic exchange resin column and by chromatographic elution with 2.5 N lactic acid at pH 4.5 in the manner described hereinbefore. The purified curium values were added to those already obtained.

It will be apparent from the foregoing that the invention provides a process wherein curium-242 may be processed at high concentration levels thereby permitting the recovery and purification of large amounts of such material in very compact equipment. Thereby efficient and economical production is obtained and capital outlay for equipment is greatly reduced.

While there have been described in the foregoing what may be considered to be preferred embodiments of the invention modifications may be made therein without departing from the spirit of the invention and it is intended to cover all such as fall within the scope of the appended claims.

What is claimed is:

1. In a process for recovering and purifying curium values from an acidic aqueous concentrated LiCl solution mixture of at least lanthanides and actinides, the steps comprising contacting said solution with a strong base anionic exchange resin to adsorb curium values with lanthanides and actinides thereon, contacting the resin adsorbate with an aqueous elutriant solution containing about 10.5 M LiCl and 0.1 N HCl to elute lanthanides therefrom, and then contacting the resin adsorbate with an aqueous elutriant solution containing a material selected from the group consisting of about 10 to 12 N HCl, and about 10 to 12 N HCl with about 0.1 N HNO$_3$ to elute curium values from the resin.

2. In a process for recovering and purifying curium values from an acidic aqueous concentrated LiCl solution mixture of lanthanides and actinides, the steps comprising contacting said solution with a strong base anionic exchange resin to adsorb curium values together with lanthanides and actinides thereon, contacting the resin adsorbate with an aqueous elutriant solution containing about 10.5 M LiCl and 0.1 N HCl to elute lanthanides therefrom, and then contacting the resin adsorbate with about 10 to 12 N HCl containing about 0.1 N HNO$_3$ to elute the curium values and transplutonium actinides from the resin leaving plutonium on the resin.

3. The process as defined in claim 1 wherein about 10 to 12 N HCl is employed to elute the curium values from the resin adsorbate.

4. In a process for recovering and purifying curium values from an acidic aqueous concentrated LiCl solution mixture of lanthanides and actinides, the steps comprising contacting said solution with a strong base anionic exchange resin to adsorb curium values together with lanthanides and actinides thereon, contacting the resin adsorbate with an aqueous elutriant solution containing about 10.5 M LiCl and 0.1 N HCl to elute lanthanides therefrom, then contacting the resin adsorbate with about 10 to 12 N HCl containing about 0.1 N $HNO_3$ to elute the curium values and transplutonium actinides from the resin leaving plutonium on the resin, and eluting the plutonium from said adsorbate with dilute HCl.

5. In a process for recovering and purifying curium values from an acidic aqueous concentrated LiCl solution mixture containing lanthanides and actinides, the steps comprising contacting said solution with a strong base anionic exchange resin to adsorb the curium values together with lanthanides and actinides thereon, contacting the resin adsorbate with an elutriant solution containing about 10.5 M LiCl and 0.1 N HCl to elute lanthanides from the resin, contacting the resin adsorbate with 10 to 12 N HCl containing about 0.1 N $HNO_3$ to elute transplutonium actinides from the resin leaving plutonium thereon, recovering curium values from the transplutonium actinide eluate, and eluting the plutonium from the resin adsorbate with dilute HCl.

6. In a process for recovering and purifying curium values from an acidic aqueous concentrated LiCl solution mixture containing lanthanides and actinides, the steps comprising contacting said solution with a strong base anionic exchange resin to adsorb the curium values together with lanthanides and actinides thereon, contacting the resin adsorbate with an elutriant solution containing about 10.5 M LiCl and 0.1 N HCl to elute lanthanides from the resin, contacting the resin adsorbate with 10 to 12 HCl containing about 0.1 N $HNO_3$ to elute transplutonium actinides from the resin leaving plutonium thereon, converting said eluate into a dilute HCl solution, contacting the dilute HCl solution with a cationic exchange resin to adsorb the curium and actinides thereon, chromatographically eluting said actinides from the cationic exchange resin, collecting the chromatographic fraction of eluate containing the curium on emergence from the column, and recovering the curium from said eluate fraction.

7. The process as defined in claim 6 which includes the step of eluting plutonium values from the resin with dilute HCl subsequent to said elution of the transplutonium elements.

8. In a process for recovering curium values from a transmutation source solid, the steps comprising producing from said solid an acidic aqueous concentrated LiCl solution containing at least lanthanides and actinides, contacting said solution with a strong base anionic exchange resin to adsorb curium values with lanthanides and other actinides thereon, contacting the resin adsorbate with an aqueous elutriant solution containing about 10.5 M LiCl and 0.1 N HCl to elute lanthanides therefrom, and then contacting the resin adsorbate with an aqueous elutriant solution containing a material selected from the group consisting of about 10 to 12 N HCl and about 10 to 12 N HCl with about 0.1 N $HNO_3$ to elute curium values from the resin.

9. In a process for recovering curium values from a transmutation source solid, the steps comprising producing from said solid an acidic aqueous concentrated LiCl solution containing at least lanthanides and actinides, contacting said solution with a strong base anionic exchange resin to adsorb curium values together with lanthanides and actinides thereon, contacting the resin adsorbate with an aqueous elutriant solution containing about 10.5 M LiCl and 0.1 N HCl to elute lanthanides therefrom, and then contacting the resin adsorbate with about 10 to 12 N HCl containing about 0.1 N $HNO_3$ to elute the curium values and transplutonium actinides from the resin leaving plutonium on the resin.

10. In a process for recovering curium values from a transmutation source solid, the steps comprising producing from said solid an acidic aqueous concentrated LiCl solution containing at least lanthanides and actinides, contacting said solution with a strong base anionic exchange resin to adsorb the curium values together with lanthanides and actinides thereon, contacting the resin adsorbate with an elutriant solution containing about 10.5 M LiCl and 0.1 N HCl to elute lanthanides from the resin, contacting the resin adsorbate with 10 to 12 N HCl containing about 0.1 N $HNO_3$ to elute transplutonium actinides from the resin leaving plutonium thereon, recovering curium values from the transplutonium actinide eluate, and eluting the plutonium from the resin adsorbate with dilute HCl.

11. In a process for producing curium 242, the steps comprising irradiating americium 241 with neutrons to produce curium 242 therein with at least transmutation and fission product impurities, producing from said irradiated americium 241 an acidic aqueous concentrated LiCl solution containing said curium and impurities, contacting said solution with a strong base anionic exchange resin to adsorb curium values with lanthanides and actinides thereon, contacting the resin adsorbate with an aqueous elutriant solution containing about 10.5 M LiCl and 0.1 HCl to elute lanthanides therefrom, and then contacting the resin adsorbate with an aqueous elutriant solution containing a material selected from the group consisting of about 10 to 12 N HCl and about 10 to 12 N HCl with about 0.1 N $HNO_3$ to elute curium values from the resin.

12. In a process for producing curium 242, the steps comprising irradiating americium 241 with neutrons to produce curium 242 therein with at least transmutation and fission product impurities, producing from said irradiated americium 241 an acid aqueous concentrated LiCl solution containing said curium and impurities, contacting said solution with a strong base anionic exchange resin to adsorb curium values together with lanthanides and actinides thereon, contacting the resin adsorbate with an aqueous elutriant solution containing about 10.5 M LiCl and 0.1 N HCl to elute lanthanides therefrom, and then contacting the resin adsorbate with about 10 to 12 N HCl containing about 0.1 N $HNO_3$ to elute the curium values and transplutonium actinides from the resin leaving plutonium on the resin.

13. In a process for producing curium 242, the steps comprising irradiating americium 241 with neutrons to produce curium 242 therein with at least transmutation and fission product impurities, producing from said irradiated americium 241 an acidic aqueous concentrated LiCl solution containing said curium and impurities, contacting said solution with a strong bas anionic exchange resin to adsorb the curium values together with lanthanides and actinides thereon, contacting the resin adsorbate with an elutriant solution containing about 10.5 M LiCl and 0.1 N HCl to elute lanthanides from the resin, contacting the resin adsorbate with 10 to 12 N HCl containing about 0.1 N $HNO_3$ to elute transplutonium actinides from the resin leaving plutonium thereon, recovering curium values from the transplutonium actinide eluate, and eluting the plutonium from the resin adsorbate with dilute HCl.

14. In a process for separating curium 242 from a neutron irradiated americium 241 slug, the steps comprising decomposing said slug in an alkali metal hydroxide-nitrate salt solution yielding an insoluble residue containing the curium, separating the solution from the residue, treating said residue to provide a solution thereof having an HCl concentration less than 6 N, adding lithium chloride to said solution to provide a concentration thereof in the range of 10 to 13.5 M, passing said solution through an anion exchange resin column to adsorb actinides and lanthanides therefrom, passing slightly acidic LiCl of about 10.5 M concentration through said column to elute lanthanides and alkaline earths, eluting a transplutonium fraction therefrom with concentrated HCl acid containing a small amount of nitric acid leaving plutonium on the resin, adsorbing said transplutonium fraction on an cation exchange resin column, passing dilute HCl acid through said column to remove traces of LiCl, eluting the transplutonium actinides with concentrated HCl acid as a group, converting the eluate fraction to a dilute HCl solution containing said actinides, contacting said solution with a cationic exchange resin column in the ammonia form to adsorb said actinides, chromatographically eluting curium therefrom with a buffered aqueous solution of an organic complexing acid, collecting the curium fraction on emergence from the column, adding HF and $HNO_3$ solution to the eluate fraction to precipitate curium fluoride from the eluate, and separating the curium fluoride from the eluate.

15. The process as defined in claim 14 wherein the alpha activity during liquid processing steps is maintained at less than 20 curies per milliliter of solution.

16. The process as defined in claim 14 wherein the alpha activity on the resin bed is maintained at a level less than about 100 curies per square centimeter of column cross sectional area.

17. In a process for separating curium 242 from a neutron irradiated americium 241 slug, the steps comprising decomposing said slug in an alkali metal hydroxide-nitrate salt solution yielding an insoluble residue containing the curium, separating the supernatant solution from the residue, treating said residue to provide a solution thereof having a concentration of less than 6 N HCl acid therein, adding LiCl to said solution to provide a concentration in the range of 10 to 13.5 M therein, passing said solution through an anion exchange resin column to adsorb lanthanides and actinides therefrom, passing slightly acidic LiCl solution of about 10.5 M concentration to elute lanthanides and alkaline earths therefrom, eluting transplutonium actinides and lanthanides therefrom with concentrated HCl acid containing a small amount of nitric acid as an eluate fraction, adsorbing said actinides and lanthanides on a cation exchange resin column, washing said column with dilute HCl acid to remove traces of LiCl, eluting said actinides from said column with concentrated HCl acid as an eluate fraction, converting the eluate fraction into a dilute HCl solution, contacting said solution with a cationic exchange resin column to adsorb the transplutonium actinides therefrom, chromatograprically eluting curium therefrom as a purified eluate fraction with a buffered aqueous solution of an organic complexing acid, adding a small amount of dilute HCl acid to said eluate fraction, adsorbing the curium values on a cationic exchange resin column, washing said column with dilute HCl acid to eliminate said organic acid, eluting the purified curium values with concentrated HCl, disposing the concentrated HCl eluate in a container, and evaporating water from the container, whereby a residue of curium oxide remains in said container.

18. The process as defined in claim 14 wherein the volume of resin in said initial column is at least sixfold to tenfold of the solution volume.

References Cited in the file of this patent
UNITED STATES PATENTS 2,711,362  Street _____ June 21, 1955

OTHER REFERENCES

Werner et al.: Nuclear Science Abstracts, vol. 1, No. 878 (1948).

Hyde: Proceedings of the International Conference on the Peaceful Uses of Atomic Energy, pp. 297–299, vol. 7, August 8–20, 1955, United Nations, New York.

Foster et al.: Proceedings of the International Conference on the Peaceful Uses of Atomic Energy, vol. 9, pp. 546–548, August 8–20, 1955, United Nations, New York.

Kraus et al.: J.A.C.S., vol. 77, p. 1381 (1955).